(12) United States Patent
Kim

(10) Patent No.: US 6,364,401 B1
(45) Date of Patent: Apr. 2, 2002

(54) REINFORCEMENT STRUCTURE FOR FRONT PILLAR PORTION OF AUTOMOBILE

(75) Inventor: Jong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/611,841

(22) Filed: Jul. 7, 2000

(30) Foreign Application Priority Data

Dec. 31, 1999 (KR) ............................................. 99-68309

(51) Int. Cl.⁷ ............................................... B62D 25/08
(52) U.S. Cl. ........................... 296/194; 296/29; 296/188
(58) Field of Search .......................... 296/29, 192, 194, 296/188, 203.03

(56) References Cited

U.S. PATENT DOCUMENTS 5,061,009 A * 10/1991 Harasaki et al. ............. 296/192
5,562,329 A * 10/1996 Srock et al. ................ 296/30 X
5,586,799 A * 12/1996 Kanemitsu et al. ......... 296/30 X

FOREIGN PATENT DOCUMENTS

RU 1754554 * 8/1992 .................. 296/204

* cited by examiner

Primary Examiner—Joseph D. Pape
(74) Attorney, Agent, or Firm—Christie, Parker & Hale, LLP

(57) ABSTRACT

A reinforcement structure for front pillar portion of an automobile has a reinforcement member between a lower end of front pillar portion and a dash panel for increasing the structural strength to the front pillar portion, reducing deformation of the front pillar portion during front and side collision accidents enhancing safety of passengers in the automobile. The reinforcement structure a front portion bent and coupled to form a closed sectional shape with an inner pillar panel, a pillar reinforcement panel, an outer pillar panel and a dash panel which partitions an engine room and the inside of the automobile. The inner pillar panel is joined by one end of the first reinforcing bracket and the dash panel is coupled to one end of a second reinforcing bracket, while the other ends of the first and second reinforcing brackets are so constructed that a closed sectional shape is formed between the inner pillar panel. The two reinforcement brackets are coupled together.

3 Claims, 5 Drawing Sheets

REINFORCEMENT STRUCTURE FOR FRONT PILLAR PORTION OF AUTOMOBILE

BACKGROUND OF THE INVENTION

1. Field of the Invention

The present invention relates to a front pillar portion of an automobile, and more particularly to a reinforcement structure for front pillar portion of automobile constructed and arranged to additionally attach a reinforcement member between a lower end of a pillar portion and a dash panel to thereby provide a structural strength to the front pillar portion, reducing deformation of the front pillar portion during front and side collision accidents for enhanced safety of passengers in the automobile.

2. Description of the Prior Art

Generally, a front body of an automobile includes as illustrated in FIG. 1, a hood portion 1 openably and closeably arranged at an engine room for mounting various parts of engine and power transmission system, a fender portion 3 encompassing wheels 2 from left/right sides of the hood portion 1 and a front pillar portion 5 lengthily extended upward for mounting a front door 4 positioned at a rear side of the fender portion 3, where a lower portion of the front pillar portion 5 is featured in FIG. 2 for illustrating an interior of the "A" section of FIG. 1.

In other words, the front pillar portion 5 contacts a seal side portion 6 vertically extended and arranged in the direction of an automobile body, where the seal side portion 6 touches a floor portion 7 inside the automobile, the floor portion 7 in turn contacts a dash panel 8 for partitioning an inside of the automobile and the engine room.

Meanwhile, the front pillar portion 5 is such constructed that an inner pillar panel 10, a pillar reinforcement panel 11 and an outer pillar panel 12 respectively form a closed sectional shape, as illustrated in FIG. 3 depicting a section along line A—A in FIG. 2.

Furthermore, the inner pillar panel 10 is coupled by a bolt to a hood release lever 13 connected via a hood latch and a cable (not shown) for opening a hood, such that a driver, when opening the hood, pulls the hood release lever 13 to release coupling of the hood latch. The inner pillar panel 10 of the front pillar portion 5 is joined by a tip end of the dash panel 8.

Meanwhile, the inner pillar panel 10 should be designed to have a sufficient strength to stand a manipulating force applied from the hood release lever 13 when the lever 13 is manipulated because the inner pillar panel 10 at the front pillar portion 5 is mounted via a bolt with the hood release lever 13 where manipulation is performed when the hood is opened. The inner pillar panel according to the prior art is therefore processed thereon with grooves and the like for reinforced structural strength of recessed and protruded shape.

However, even though the inner pillar panel 10 is formed thereon with grooves for reinforced structural strength, the inner pillar panel 10 tends to be deformed due to manipulation power applied thereto by frequent manipulation of the hood release lever 13, which makes it impossible to perform a normal operation when the hood release lever 13 is manipulated and causes an exterior appearance deteriorated.

Furthermore, the deformation generated at the inner pillar panel 10 of the front pillar portion 5 by frequent manipulation of the hood release lever 13 can hardly absorb shock transmitted to the body during front and lateral collision accidents, thereby threatening safety of passengers in the automobile.

SUMMARY OF THE INVENTION

The present invention is disclosed to solve the aforementioned problems and it is an object of the present invention to provide a reinforcement structure for front pillar portion of automobile constructed and arranged to additionally attach a reinforcement member between a lower end of front pillar portion and a dash panel to thereby provide a structural strength to the front pillar portion, minimizing deformation of the front pillar portion during front and side collision accidents for safety of passengers in the automobile.

In accordance with the object of the present invention, there is a provided a reinforcement structure for a front pillar portion of an automobile in a front body of the automobile having a front pillar portion bent and coupled to form a closed sectional shape by an inner pillar panel, a pillar reinforcement and an outer pillar panel and a dash panel for partitioning an engine room and an inside of the automobile by being coupled to the inner pillar panel at the front pillar portion, therein the inner pillar panel is joined by one end of a first reinforcement bracket and the dash panel is coupled by one end of a second reinforcement bracket, while the other ends of the first and second reinforcement bracket, while the other ends of the first and second reinforcement brackets are so constructed that a closed sectional shape is formed between the inner pillar panel and the dash panel by reinforcement members respectively overlapped and coupled.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

A preferred embodiment of the present invention will now be described in detail with reference to the accompanying drawings.

Figure 1:
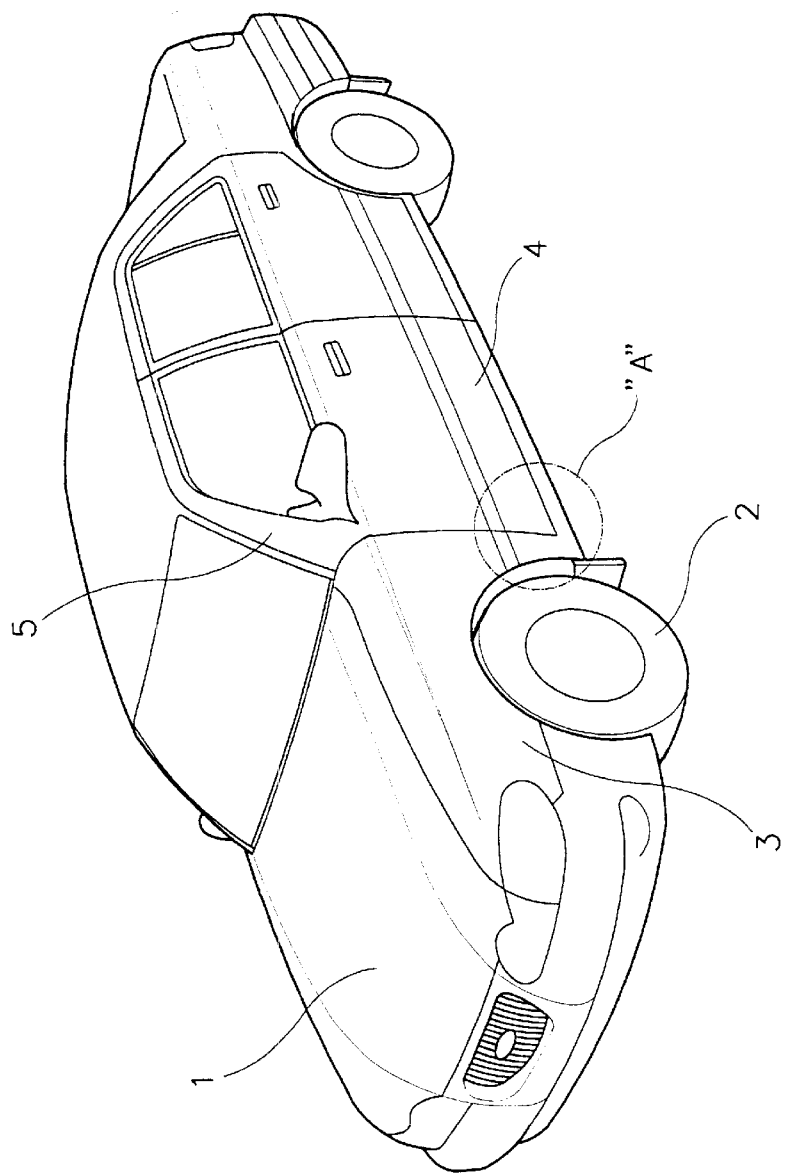
FIG. 1 is a perspective view for illustrating an external appearance of a conventional automobile.
Figure 2:
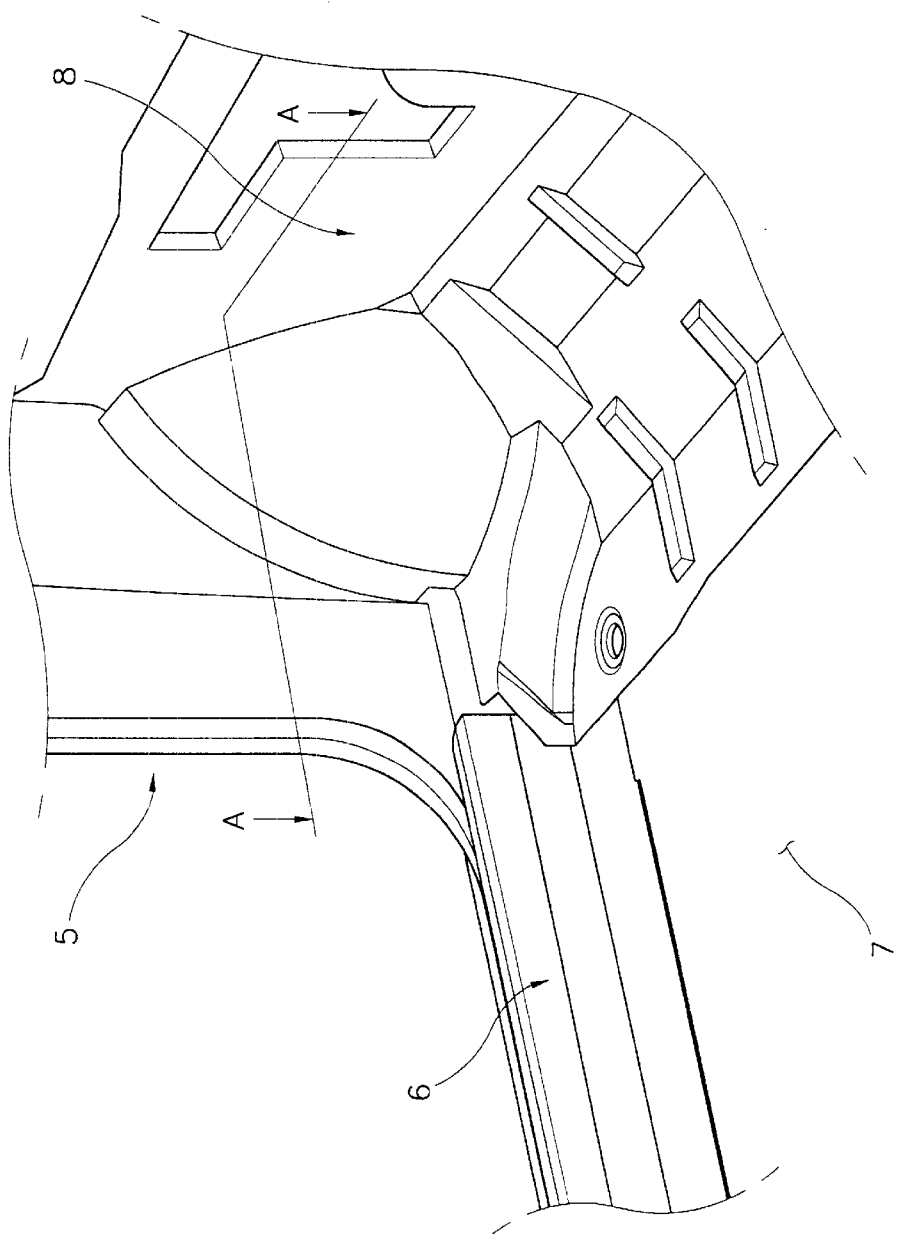
FIG. 2 is a perspective view for schematically illustrating an inner lower end area of a front pillar portion of an automobile body according to the prior art.
Figure 3:
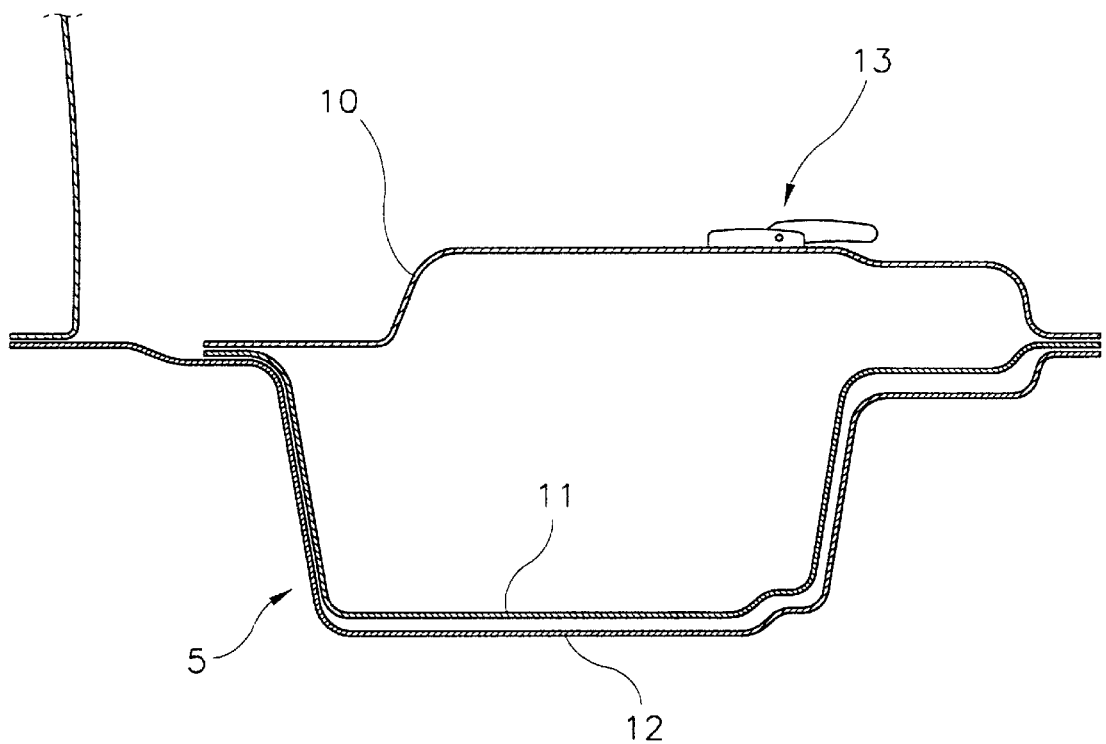
FIG. 3 is a sectional view taken along line A—A in FIG. 2.
Figure 4:
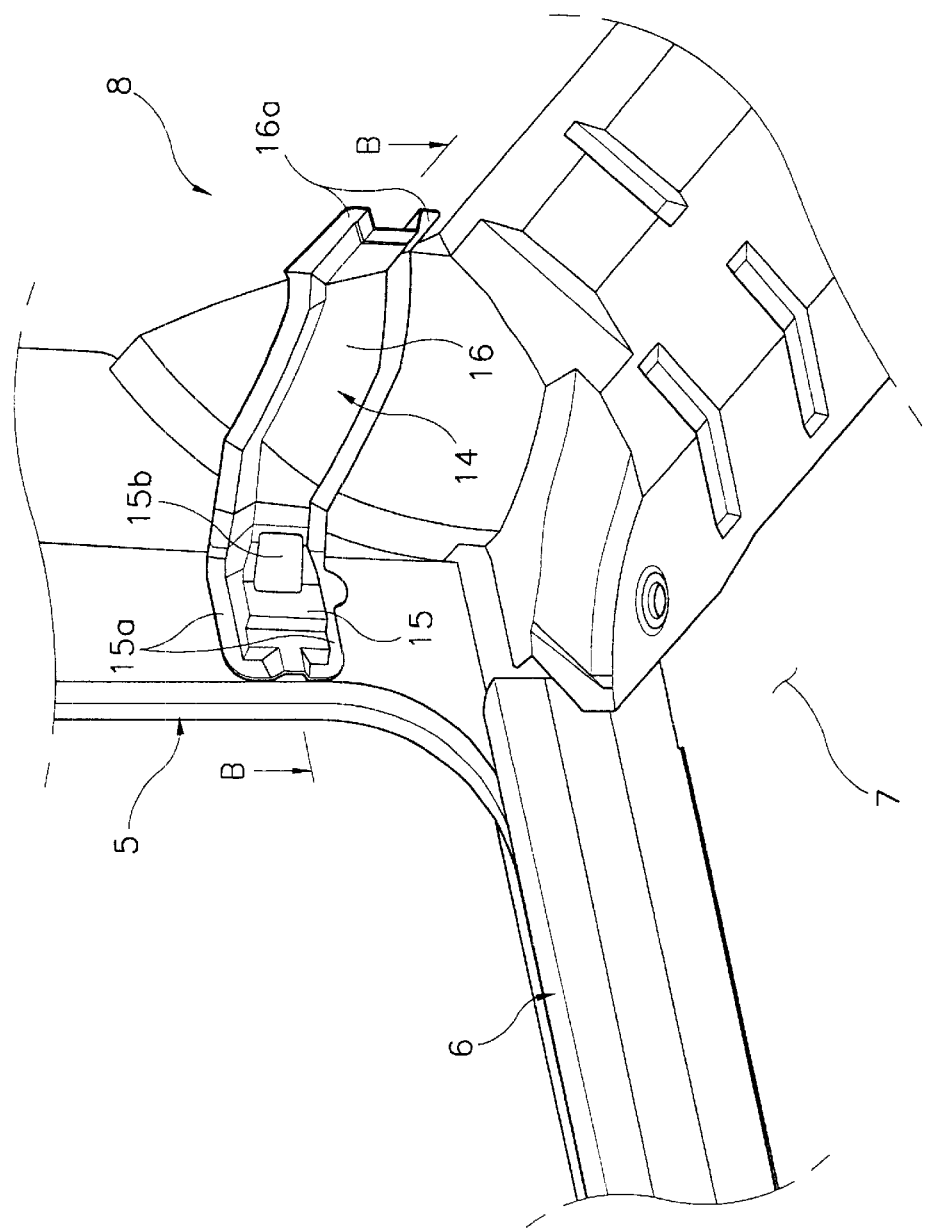
FIG. 4 is a perspective view for schematically illustrating an inner lower end area of front pillar portion of an automobile body according to the present invention.
Figure 5:
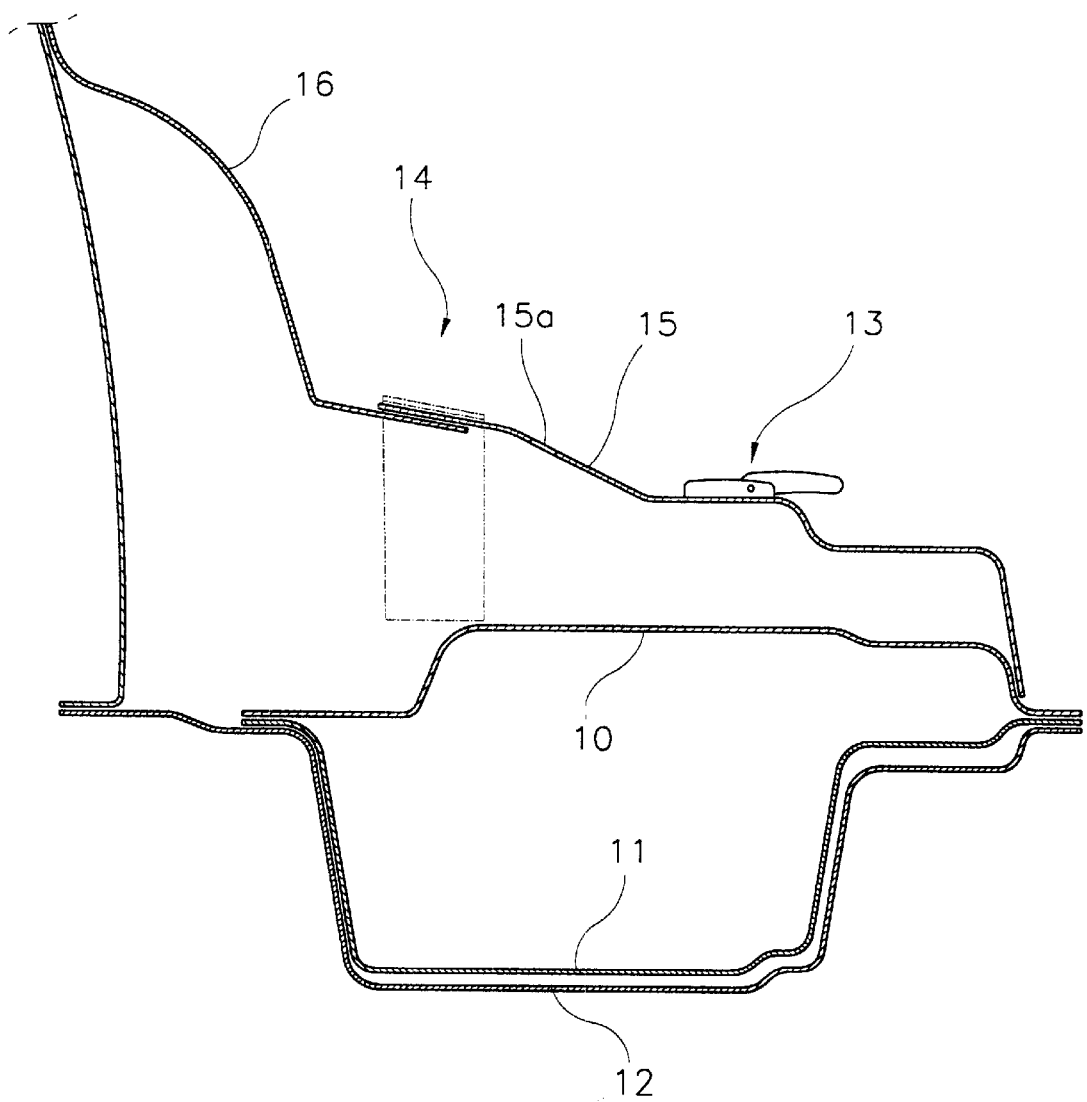
FIG. 5 is a sectional view taken along line B—B in FIG. 4.

FIG. 4 is a perspective view for schematically illustrating an inner lower end area of front pillar portion of an automobile body according to the present invention, and FIG. 5 is a sectional view taken along line B—B in FIG. 4, where throughout the drawings like reference numerals are used for designation of like or equivalent parts or portions as in FIGS. 2 and 3 for depicting structure of a front pillar portion according to the prior art, and reference numerals for principal portions or parts of front body not described will refer to FIG. 1.

As illustrated in the drawings, front pillar portions 5 each vertically extended at both left/right sides of front body of the automobile contact a seal side portion 6 mounted lengthwise of the automobile body, while the seal side portion 6 touches the floor portion 7 insides the automobile. The floor portion 7 in turn contacts a dash panel 8 for partitioning an engine room and the inside room of the automobile.

The front pillar portion 5, as illustrated in FIG. 5 depicting a section taken along line B—B of FIG. 4, includes an inner pillar panel 10, a pillar reinforcement panel 11 and an outer pillar panel 12 each bent and mutually joining for forming a closed section, where a front tip end of the inner pillar panel 10 joins a tip end of dash panel 8.

Furthermore, between a rear tip end of the inner pillar panel 10 and a predetermined part of the dash panel 8 there is so joined a reinforcement member 14 to form a closed section, where the reinforcement member 14 includes a first reinforcement bracket 15 where a tip end joins a rear tip end of the inner pillar panel 10 and a second reinforcement bracket 16 where a tip end joins a predetermined part of the dash panel 8. Each tip end of the other end of the first and second reinforcement brackets 15 and 16 is overlapped and spaced at a predetermined distance, where the overlapped part is welded.

The first and second reinforcement brackets 15 and 16 are bent and protruded at each sectional surface thereof to form a predetermined size of space between the inner pillar panel 10 and the dash panel 8.

Meanwhile, the first and second reinforcement brackets 15 and 16 are integrally formed at upper and lower sides thereof with flange surfaces 15a and 16a, each extended and bent to one direction.

The first reinforcement bracket 15 at the reinforcement member 14 is mounted with a hood release lever 13 via a hood latch and a cable (not shown) for opening the hood.

Accordingly, when the reinforcement member 14 is installed between the inner pillar panel 10 of the front pillar portion 5 and the dash panel 8, the inner pillar panel 10 can reinforce structural strength via the reinforcement member 14, whereby, when an external force is applied to the front pillar portion 5, the front pillar portion 5 can exercise a further reinforced structural strength according to support force generated from the reinforcement member 14 in addition to its intrinsic structural strength.

In other words, a shock transmitted to the body of the automobile during a front collision is absorbed by the first reinforcement bracket 15 which a shock transmitted to the body during lateral collision is absorbed by the second reinforcement bracket 16.

Furthermore, once the structural strength relative to the front pillar portion 5 thus described is reinforced by the reinforcement member 14, the inner pillar panel 10 is not deformed even when the hood release lever 13 mounted at the inner pillar panel 10 is activated, which is resulted from the front pillar portion 5 reinforced of its strength by the reinforcement member 14.

Meanwhile, the first reinforcement bracket 15 at the reinforcement member 14 is formed with a through hole 15b having a predetermined size, where the through hole 15b is for insertion of a welding gun therethrough for welding the overlapped part between the first and the second reinforcement bracket 15 and 16 because both brackets 15 and 16 are assembled while respectively joined at the inner pillar panel 10 and the dash panel 8.

As apparent from the foregoing, there is an advantage in the reinforcement structure for front pillar portion of automobile according to the present invention thus described in that a reinforcement member is joined in between an inner pillar panel and a dash panel to reinforce a structural strength to the inner pillar panel and to minimize deformation of the front pillar portion even at shock transmitted to the body during front and lateral collisions, thereby providing an enhanced safety to passengers inside the automobile.

What is claimed is:

1. An automobile front pillar reinforced structure comprising:
    a lower front pillar portion proximate a floor of the automobile and comprising,
        an inner pillar panel,
        an outer pillar panel, and
        a pillar reinforcement panel between the inner and outer pillar panels;
    a dash panel separating an engine compartment of the automobile from a passenger compartment of the automobile;
    a first reinforcement bracket having a first end portion coupled to the inner pillar panel; and
    a second reinforcement bracket having a first end portion coupled to the dash panel, and a second end portion coupled to a second end portion of the first reinforcement bracket.

2. The structure of claim 1, wherein the first reinforcement bracket and the second reinforcement bracket are integrally formed with flange surfaces respectively extending and bent from upper and lower sides thereof.

3. The structure of claim 1, wherein the second end portion of the first bracket and the second end portion of the second bracket are overlapped and welded to each other.

* * * * *